United States Patent [19]

Koizumi et al.

[11] Patent Number: 5,422,868
[45] Date of Patent: Jun. 6, 1995

[54] AUDIO SIGNAL RECORDING APPARATUS WITH A TRACK NUMBER SIGNAL GENERATING FUNCTION

[75] Inventors: Satoshi Koizumi; Hirokazu Inotani, both of Tokorozawa, Japan

[73] Assignee: Pioneer Electronic Corporation, Tokyo, Japan

[21] Appl. No.: 260,988

[22] Filed: Jun. 15, 1994

[30] Foreign Application Priority Data

Jun. 16, 1993 [JP] Japan .................................. 5-144727

[51] Int. Cl.6 .............................................. G11B 17/22
[52] U.S. Cl. ........................................ 369/32; 369/48
[58] Field of Search ............. 369/32, 48, 275.3, 275.2, 369/275.4, 13, 59, 50–51, 58, 56, 54, 44.11, 44.26, 44.28; 360/48, 39, 40, 51, 8, 28, 19.1

[56] References Cited

U.S. PATENT DOCUMENTS 5,023,730  6/1991  Sakata et al. .......................... 360/48
5,315,568  5/1994  Dente et al. .......................... 369/32

Primary Examiner—Georgia Y. Epps
Assistant Examiner—Ali Neyzari
Attorney, Agent, or Firm—Finnegan, Henderson, Farabow, Garrett & Dunner

[57] ABSTRACT

An audio signal recording apparatus is constructed to record a track number signal which allows a sure detection of a head position of a music piece. An audio signal to be recorded is delayed for the recording by a first predetermined time period. A start time of each music piece is detected by a transition from a silent state to a sound bearing state of the audio signal, and a track number signal is incremented at a timing of a second predetermined time period, which is shorter than the first predetermined time period, after a detection of the start time of a music piece, and the track number signal having been incremented.

2 Claims, 4 Drawing Sheets

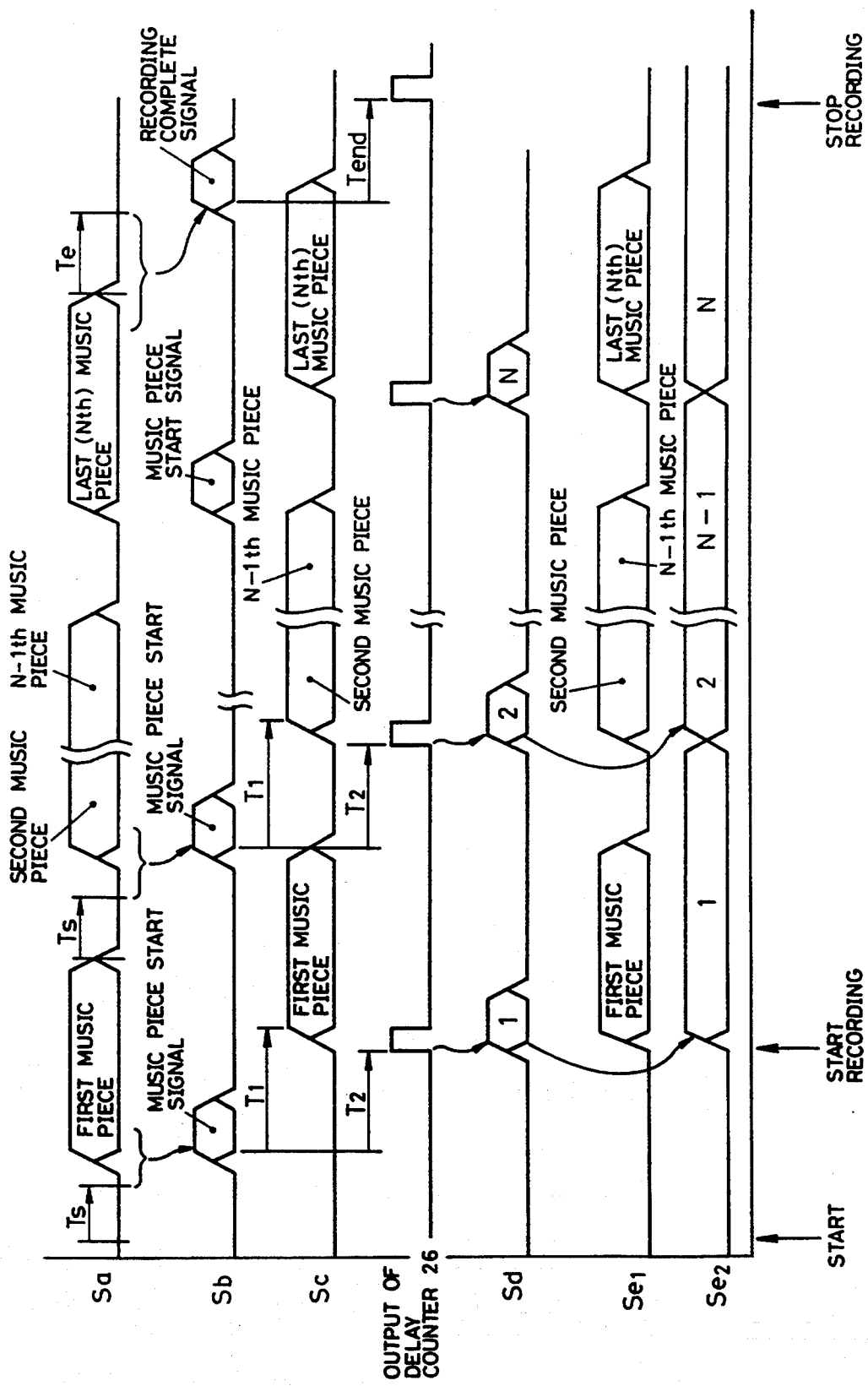

AUDIO SIGNAL RECORDING APPARATUS WITH A TRACK NUMBER SIGNAL GENERATING FUNCTION

BACKGROUND OF THE INVENTION

1. Field of the Invention

The present invention relates to a recording apparatus for recording an audio signal.

2. Description of Background Information

In the recording of music software on a recording medium such as a CD (Compact Disc), an MD (Mini Disc), or a DAT (Digital Audio Tape), it is general to record subcode information representing data relating to the recorded music piece such as the music piece number in addition to the audio signal corresponding to each music piece. In a playing apparatus, such as a CD player, for playing back the recorded music software, the subcode information is retrieved, in addition to the audio signal, from the recording medium so that a fast access to the head part of a desired music piece is enabled by using such subcode information. Therefore, it is desired that the information representing the music piece number is recorded together with the audio signal also in a recording apparatus for the dubbing of music pieces from music software recorded on the above-described recording medium.

However, with a conventional arrangement for the recording of the audio signal and the track number information, there has been a problem that the recorded track number cannot be used for the fast access to the desired music piece because of the time difference between the recorded audio signal and the track number information.

OBJECTS AND SUMMARY OF THE INVENTION

An object of the present invention is therefore to overcome the drawback of the conventional apparatus, and to provide an audio signal recording apparatus which performs the generation and recording of a track number signal by which the sure detection of a head part of a music piece is enabled.

According to the present invention, an audio signal recording apparatus for recording an audio signal corresponding to at least one music piece on a recording medium, comprises a delay circuit for delaying the audio signal by a first predetermined time period, and producing a delayed audio signal, a voice detection circuit for detecting a start time of a music piece based on a transition from a silent state to a sound bearing state of the audio signal, and producing a detection signal, a storage device for storing a track number signal representing the number of a music piece, a circuit for incrementing the track number signal stored in the storage device by one each time a second predetermined time period shorter than the first predetermined time period has elapsed after a generation of the detection signal, and a recording device for recording a recording signal produced by respectively modulating the delayed audio signal and the track number signal, on the recording medium.

By the recording apparatus configured as described above, the audio signal is delayed by the first predetermined period and recorded on the recording medium, and the start time of one music piece is detected based on a transition from a silent state to a sound bearing state of the audio signal, and the track number signal incremented at the timing at which the second predetermined time period shorter than the first predetermined time period has elapsed after the detection of the start time is recorded on the recording medium.

BRIEF DESCRIPTION OF THE DRAWINGS

FIG. 5 is a timing chart showing an example of recording operation performed by the audio signal recording apparatus according to the present invention.

DETAILED DESCRIPTION OF PREFERRED EMBODIMENT

Before entering into the description of the embodiment of the recording apparatus according to the present invention, a prior art recording apparatus will be explained with reference to FIGS. 1 and 2 of the accompanying drawings.

Figure 1:
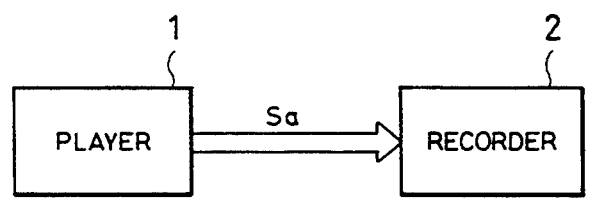
FIG. 1 is a diagram illustrating an arrangement for a dubbing recording of an audio signal.

As shown in FIG. 1, a CD player 1 which is used as an audio signal source plays a CD (Compact Disc) carrying music software, and supplies an audio signal Sa corresponding to music pieces recorded on the CD to a CD-R (Compact Disc Recordable) recorder 2 which is used as a recording apparatus.

The CD-R recorder 2 is designed to detect a silent (mute) portion of the audio signal Sa supplied from the CD player 1. In the CD-R recorder 2, a sound bearing part of the audio signal Sa subsequent to the detection of the silent portion is further detected, to judge that a part of the audio signal corresponding to a head portion of a music piece is supplied from the signal source. A track number signal for discriminating the music piece number is incremented by one in response to this detection. Concurrently to this operation, the CD-R recorder 2 starts the recording of the audio signal Sa as well as the track number signal on a recording disc. In other words, the recording operation of the conventional recording apparatus is based on the provision of a silent portion of more than a predetermined period between neighboring two of music pieces recorded on a music software CD, and the conventional recording apparatus is constructed to detect a transition from a silent state to a sound bearing state of the audio signal, and automatically generate a track number according to the music piece number by incrementing the track number by one each time such a transition is detected.

However, in case of the operation described above, the increment of the track number signal is performed after the audio signal corresponding to the head part of a music piece has been supplied. This means that the track number signal corresponding a music piece is recorded on the recording medium after the audio signal corresponding to the head part of the music piece has been recorded. For instance, in FIG. 2, depicting a case where the audio signal Sa corresponding to the first and second music pieces is supplied to the CD-R recorder 2, the track number is incremented from "1" to "2" after the detection of the silent portion t of the audio signal Sa, and the start of the audio signal corresponding to the second music piece.

Figure 2:
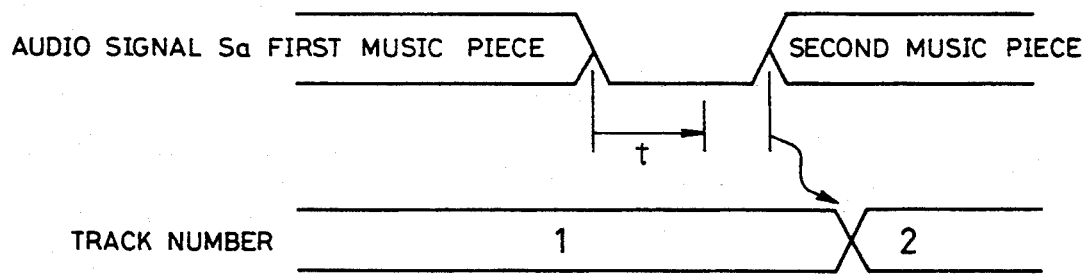
FIG. 2 is a timing chart showing the timing of the recording of a track number signal by a conventional recording method.

Therefore, if a disc on which the audio signal and the track number are recorded at timings shown in FIG. 2 is loaded in a CD player and a fast access to the second music piece is performed, there will be a problem that the head part of the second music piece is not reproduced.

Now, the embodiment of the audio signal recording apparatus according to the present invention will be described.

Figure 3:
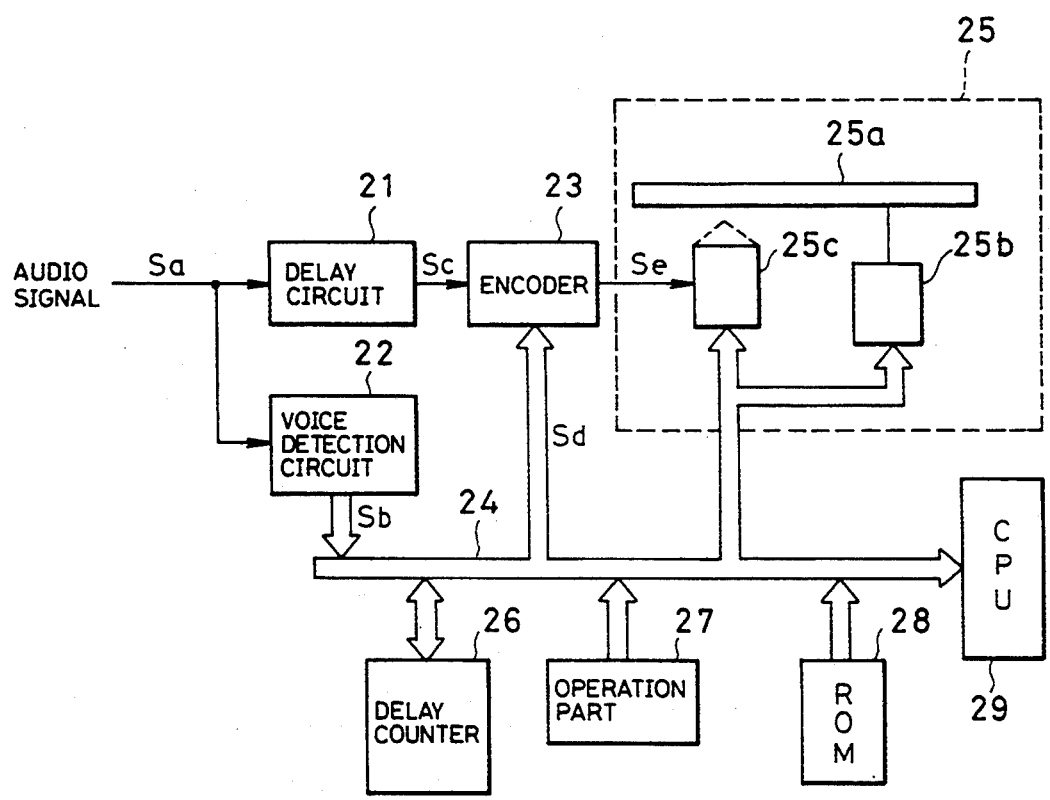
FIG. 3 is a block diagram showing the structure of the audio signal recording apparatus according to the present invention.

FIG. 3 shows the structure of the recording apparatus according to the present invention.

In FIG. 3, a digital audio signal Sa of music pieces from a signal source is supplied to a delay circuit 21 and also to a voice detection circuit 22. If the signal source supplies an analog audio signal, the analog audio signal is converted to a digital audio signal by means of an A/D converter which is not illustrated in FIG. 3, and the digital audio signal produced by the A/D converter is supplied to the delay circuit 21 and to the voice detection circuit 22, respectively. The delay circuit 21 delays the supplied audio signal Sa by a predetermined period (delay time) T1, and supplies it to an encoder 23 as a delayed audio signal Sc. The voice detection circuit 22, on the other hand, detects a condition that the supplied audio signal Sa has been silent for a period Ts and subsequently a sound bearing part has appeared, generates a music piece start signal upon detection of such a condition, and supplies the music piece start signal to a CPU bus 24 as a detection signal Sb. The voice detection circuit 22 further detects a condition that the supplied audio signal Sa has entered into a silent part from the sound bearing part, and generates a recording complete signal when such a silent condition has continued more than a predetermined period Te (Te>Ts), and supplies the recording complete signal to the CPU bus 24 as the detection signal Sb. In connection with the operation of the voice detection circuit 22, the above described period Ts is determined in accordance with a between music pieces recorded on the music software CD, and set to 2 seconds, for example. The period Te is used for determining that the play of all music pieces recorded on the music software CD is completed, and set to five seconds, for example. The encoder 23 is designed to produce a modulation signal Se by respectively modulating the delayed audio signal Sc supplied from the delay circuit 21 and the track number signal Sd supplied from the CPU 24 bus, and supplies the modulation signal Se to a recording unit 25.

The recording unit 25 includes a recording disc 25a as an audio signal recording medium, a spindle motor 25b for rotating the recording disc 25a, and an optical head 25c for modulating a light beam by the modulation signal Se and irradiating the modulated light beam on the recording disc 25a. By means of the light beam irradiated from the optical head 25c, the modulation signal Se is recorded on the recording disc 25a. The apparatus also includes a delay counter 26 that is arranged to start a counting operation in response to a count start signal supplied via the CPU bus 24, and to transmit a count value T of each moment to the CPU bus 24. In response to a counter reset instruction signal supplied via the CPU bus 24, the delay counter 26 resets the count value T and stops the counting operation.

Furthermore, an operating device 27 is used to transmit an operation request signal to the CPU bus 24 according to a user's instruction of operation. For example, the operating device 27 transmits a recording operation request signal to the CPU bus 24 in accordance with a recording operation instruction by the user. Through the CPU bus 24, a CPU (Central Processing Unit) 29 executes various control operations of the recording apparatus including the above-described elements, in accordance with operational procedures stored in a ROM (Read Only Memory) 28.

The recording operation of the recording apparatus according to the present invention will be described hereinafter.

Figure 4:
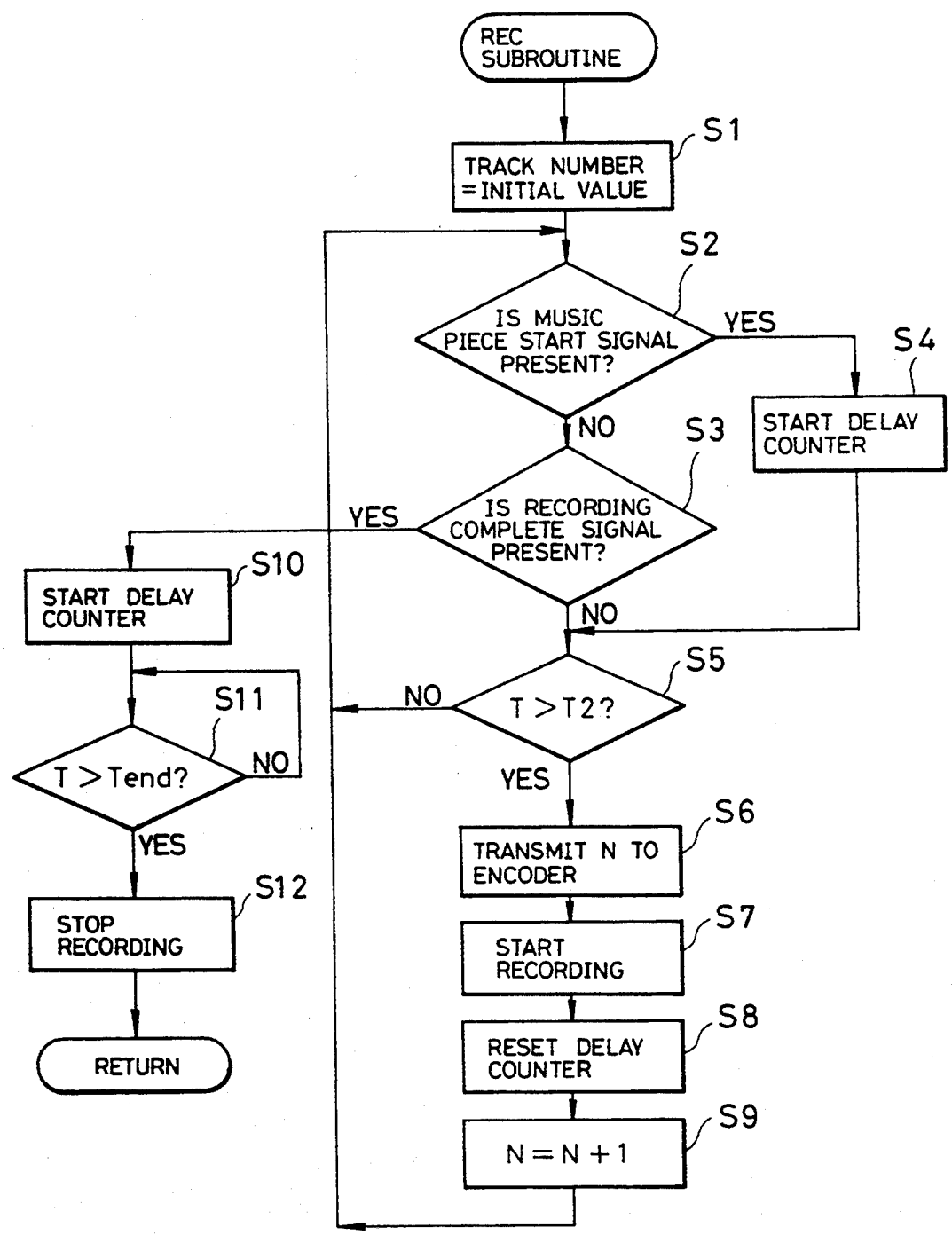
FIG. 4 is a flowchart showing processing steps of a recording subroutine performed by the audio signal recording apparatus according to the present invention.

FIG. 4 is a flowchart showing control operations of a subroutine executed by the CPU 29, in the recording apparatus according to the present invention.

Initially, a recording operation request signal is transmitted from the operating device 27 to the CPU bus 24 in response to the user's instruction of recording. In response to the recording operation request signal, the CPU 29 transmits a control signal to place the recording unit 25 at a recording pause state to the CPU bus 24, and starts the execution of the procedure of the subroutine shown in the flowchart of FIG. 4.

As shown in the flowchart of FIG. 4, the CPU 29 at first stores an initial value of the track number into a register N within the CPU 29 (step S1). In this operation, the initial value is set to be a value calculated by adding a value "1" to the track number of the last music piece recorded on the recording disc for recording the audio signal. For instance, when the recording of a music piece is additionally performed on a recording disc on which five music pieces have already been recorded, the CPU 29 sets the initial value to "6" and stores it in the register N. If the recording disc is a blank disc on which no music pieces are recorded, the CPU 29 set the initial value to "1", and stores it in the register N.

Then the CPU 29 judges whether or not a music piece start signal is supplied to the CPU bus 24 (step S2). If it is judged in step S2 that the music piece start signal is not supplied, the CPU 29 judges whether or not a recording complete signal is supplied to the CPU bus 24 (step S3). If it is judged in step S2 that the music piece start signal is supplied, the CPU 29 transmits a counter start instruction signal to the delay counter 26 via the CPU bus 24 (step S4). In response to this instruction signal, the delay counter 26 starts the counting operation, and transmits the count value T of the moment to the CPU 24 bus. After the execution of the step S4, if it is judged in step S3 that the recording complete signal is not supplied, the CPU 29 judges as to whether or not the count value T of the delay counter 26 has exceeded a value corresponding to a period T2. The period T2 is determined to be slightly shorter than the delay time T1 of the delay circuit 21. If it is detected in step S5 that the count value T has not exceeded the period T2, the process returns to the step S2, and the operations described above will be repeated. If it is judged in step S5 that the count value T has exceeded the period T2, the CPU 29 transmits, as the track number signal, the value held in the internal register N to the encoder 23 through the CPU bus 24 (step S6).

Subsequently, the CPU 29 transmits a recording start instruction signal to the recording unit 25 through the CPU bus 24. In response to this instruction signal, the recording unit 25 cancels a pause state, to start the recording operation. In this instance, if the recording unit 25 is performing the recording operation, such a condition of operation will be maintained. Then the CPU 29 transmits a counter reset instruction signal to the delay counter 26 through the CPU bus 24 (step S8). In response to this instruction, the delay counter resets its count value T, to stop the counting operation. Then the CPU 29 rewrites the value in the incorporated register by a value calculated by adding a "1" to the value in the register (step S9), and returns to the execution of the operation at step S2. Subsequently, the operations described above will be repeated.

If it is judged in step S3 that the recording complete signal is supplied, the CPU 29 transmits the counter start instruction signal to the delay counter 26 through the CPU bus 24 (step S10). In response to this instruction, the delay counter 26 starts the counting operation, and the count value of the moment is transmitted to the CPU bus 24. Subsequently, the CPU 29 performs a comparison of the count value T and a period Tend (step S11) until the count value exceeds a value corresponding to the period Tend. The period Tend is determined to be identical with the delay time T1 of the delay circuit 21. If it is judged in step S11 that the count value T of the delay counter 26 has exceeded the period Tend, the CPU transmits a recording stop instruction signal to the recording unit 25 through the CPU bus 24 (step S12), and exits the subroutine which has been described, to return to a main routine.

Now, an example of dubbing recording operation performed through the operations in the subroutine described in the foregoing will be explained with reference to the flowchart of FIG. 5.

At first, an initial value "1" of the track number is stored in the register N within the CPU 29 by the operation of step S1. Subsequently, the audio signal Sa (corresponding to N music pieces) of the music pieces recorded on a CD is consecutively supplied from the audio signal source which can be referred to as "dubbing source". In this instance, a silent state will be continued unless a head portion of the audio signal corresponding to the first music piece reaches the recording apparatus itself. This means that the voice detection circuit 22 will not transmit the music piece start signal or the recording complete signal. Accordingly, the CPU 29 repeatedly executes the operations of steps S2, S3 and S5 in this period, to wait for the arrival of such an audio signal portion. Subsequently, when the head part of the audio signal corresponding to the first music piece has arrived at the recording apparatus itself after the continuance of the silent state for the period Ts, the voice detection circuit 22 generates the music piece start signal upon detection of the presence of sound at the head part of the first music piece, and transmits it as the detection signal Sb through the CPU bus 24. By this operation, the supply of the music piece start signal is judged at step S2, and the operation of the step S4 is executed so that the delay counter 26 starts the counting operation. During this period, the audio signal Sa is delayed by the period T1 by means of the delay circuit 21, to form a delayed audio signal Sc shown in FIG. 5, which in turn is supplied to the encoder 23. In this instance, the count value of the delay counter 26 exceeds the period T2 at a timing slightly earlier than the lapse of the period T1, the operation in step S6 is executed at this timing.

By the execution of the operation in step S6, the value held in the register N, that is the initial value "1" is supplied, as the track number signal Sd as shown in FIG. 5, to the encoder 23. Subsequently, the operation in step S7 is executed to start the recording operation. In this stage, the encoder 23 holds the supplied track number, and produces a signal $Se_2$ shown in FIG. 5 by modulating the track number, and also a signal $Se_1$ shown in FIG. 5 by modulating the delayed audio signal Sc. The encoder 23 produces the modulation signal Se by combining the signals $Se_1$ and $Se_2$, and supplies it to the optical head 25c. Therefore, the modulation signal Se based on each of the signals $Se_1$ and $Se_2$ corresponding to the first music piece, shown in FIG. 5 is recorded on the recording disc 25a at the timing condition shown in the figure where the increment of the track number is performed not later than the start of the music piece.

Then, the delay counter 26 is reset by the execution of the operation in step S8, and the value held in the register N is incremented by one to a value "2" through the operation in step S9. By the execution of the operations in steps S8 and S9 in this way, a preparation for the reception of the second music piece to be supplied from the "dubbing source" is completed. Then, the operations in steps S2, S3, and S5 are again executed repeatedly, to wait for the supply of the audio signal corresponding to the second music piece. That is, the operations in steps S2, S3, and S5 are repeated until the voice detection circuit 22 detects a sound bearing state after the lapse of the silent state lasted for the period Ts, as a pause period between music pieces, subsequent to the completion of the supply of the first music piece, and newly transmits the music piece start signal to the CPU bus 24. In this period, when the head part of the audio signal corresponding to the second music piece is supplied to the recording apparatus itself, the voice detection circuit 22 generates a music piece start signal upon detection of the sound bearing state of the head part of the second music piece, and transmits it to the CPU bus 24. By this operation, the supply of the music piece start signal is judged in step S2, and the operation in step S4 is executed so that the delay counter 26 starts the counting operation.

When the count value T of the delay counter 26 exceeds the period T2, the operation in step S6 is immediately executed at that timing. By the execution of the operation in step S6, the value held in the internal register N, that is, "2" is supplied, as the track number signal Sb shown in FIG. 5, to the encoder 23. Therefore, the modulation signal Se based on each of the signals $Se_1$ and $Se_2$ corresponding to the second music piece, shown in FIG. 5 is recorded in the recording disc 25a at the timing condition shown in the figure where the increment of the track number is performed not later than the start of the music piece.

By repeatedly executing the operations described above, the audio signal corresponding the first to the Nth (being the last) music pieces and the track number signal indicating the music piece number of each music piece are consecutively recorded on the recording disc 25a.

In other words, in the audio signal recording apparatus according to the present invention, the audio signal to be recorded supplied from the audio signal source is delayed by the period T1 which forms a first period of time, and the delayed audio signal is recorded on the recording medium. At the same time, the start position of a music piece is detected based on the transition from the silent state to the sound bearing state of the audio signal. Through the operation of the steps S2, S4 and S5, the track number which has been incremented by the operation of the step S9 is recorded on the recording medium at the timing where the period T2 which forms a second time period has elapsed after the timing of the detection of the start position of the music piece.

In this process, when the supply of the audio signal corresponding to the Nth (last) music piece is completed, there remains no music piece after the Nth music piece. This means that a silent state will be continued. When such a silent state has continued for more than a period Te (Te>Ts), 5 seconds for example, the voice detection circuit 22 produces the recording complete signal, and transmits it to the CPU bus 24 as the detection signal Sb. By this operation, the supply of the recording complete signal is detected at step S3, and the operation of the step S10 is performed so that the delay counter 26 starts its counting operation. When the count value T of the delay counter 26 exceeds the period Tend, it can be said that the recording of the portion of the delayed audio signal corresponding to the Nth (last) music piece is completed, and the recording operation is automatically terminated at the timing where the count value T of the delay counter 26 has exceeded the period Tend.

As explained in the foregoing, the recording apparatus according to the present invention is designed so that the audio signal to be recorded, which is supplied by a signal source, is delayed by a first predetermined time period and recorded on a recording medium, and a start time of each music piece is detected by a transition from a silent state to a music bearing state of the audio signal. A track number signal is incremented at a timing a second predetermined time period, which is shorter than the first predetermined time period, after a detection of the start time of a music piece, and the track number is recorded on the recording medium.

According to the present invention, a track number signal representing the number of each music piece is recorded at a timing immediately before the start of the head part of the music piece. By this feature, the recording medium recorded by the recording apparatus according to the present invention enables a sure head part searching operation, when playing a recording medium, whereby a desired music piece can be picked up and the playback of its head part can be performed without fail.

What is claimed is:

1. A recording apparatus for recording an audio signal corresponding to at least one music piece on a recording medium, comprising:

delay means for delaying said audio signal by a first predetermined time period, and producing a delayed audio signal;

voice detection means for detecting a start time of a music piece based on a transition from a silent state to a sound bearing state of said audio signal, and producing a detection signal;

storage means for storing a track number signal representing a number of a music piece;

means for incrementing said track number signal stored in said storage means by one each time a second predetermined time period shorter than said first predetermined time period has elapsed after a generation of said detection signal; and recording means for recording a recording signal produced by respectively modulating said delayed audio signal and said track number signal, on said recording medium.

2. A recording apparatus as claimed in claim 1, further comprising an initial value setting means for setting an initial value of said track number signal, said initial value setting means setting said initial value of said track number signal to "1" when said recording medium has no data recorded thereon, and when a number of music pieces are already recorded on said recording medium, to a value obtained by incrementing a last track number indicating the number of said music pieces recorded on said recording medium by one.

* * * * *